United States Patent
Jackson

(10) Patent No.: US 6,526,665 B2
(45) Date of Patent: Mar. 4, 2003

(54) GLINT-RESISTANT POSITION DETERMINATION SYSTEM

(75) Inventor: David A. Jackson, Point Roberts, WA (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/884,946

(22) Filed: Jun. 21, 2001

(65) Prior Publication Data

US 2002/0092183 A1 Jul. 18, 2002

Related U.S. Application Data

(60) Provisional application No. 60/214,390, filed on Jun. 28, 2000.

(51) Int. Cl.$^7$ ............................................. G01B 11/275
(52) U.S. Cl. ................. 33/203.18; 356/155; 356/139.09
(58) Field of Search ........................... 33/203.18, 286, 33/288, 293, 203, 227, 228; 382/291, 103, 104, 151; 348/169; 356/155, 139.09

(56) References Cited

U.S. PATENT DOCUMENTS

| | | | |
|---|---|---|---|
| 4,249,824 A | * | 2/1981 | Wiederrich et al. ......... 356/155 |
| 4,643,578 A | | 2/1987 | Stern ........................... 356/376 |
| 5,024,001 A | * | 6/1991 | Borner et al. ............. 33/203.18 |
| 5,489,983 A | * | 2/1996 | McClenehan et al. . 356/139.09 |
| 5,535,522 A | * | 7/1996 | Jackson ........................ 33/288 |
| 5,724,128 A | | 3/1998 | January ................... 356/139.09 |
| 5,724,743 A | * | 3/1998 | Jackson ........................ 33/288 |
| 5,886,781 A | * | 3/1999 | Muller et al. .......... 356/139.09 |
| 6,043,875 A | * | 3/2000 | Samuelsson ........... 356/139.09 |

FOREIGN PATENT DOCUMENTS

| | | |
|---|---|---|
| FR | 2735861 | 12/1996 |
| GB | 2283090 | 4/1995 |

* cited by examiner

Primary Examiner—Diego Gutierrez
Assistant Examiner—Tania C. Courson
(74) Attorney, Agent, or Firm—McDermott, Will & Emery

(57) ABSTRACT

An improved position determination system that is resistant to interference caused by glint, such as from the Sun. The position determination system for determining positional parameters of an object has a target device comprising a base configured for attaching to the object, first and second target surfaces connected to the base; wherein the planes on which the first target surface and the second target surface are located are non-parallel to each other. The position determination system further comprises an image sensing device configured for forming a viewing path intersecting the target device and generating image information indicative of the geometric characteristics of the target device, and a data processing device configured to couple to the image sensing device for determining the orientation of the object based on the image information. If one of the target surfaces becomes obscured as a result of glint, the image of the other target surface alone is sufficient to determine object orientation.

5 Claims, 5 Drawing Sheets

GLINT-RESISTANT POSITION DETERMINATION SYSTEM

RELATED APPLICATION

The present application claims the benefit of priority from U.S. Provisional Patent Application Serial No. 60/214,390 filed Jun. 28, 2000, entitled "METHOD AND APPARATUS FOR PERFORMING UNDERCAR DIAGNOSTICS."

FIELD OF INVENTION

The present invention relates to an improved position determination system, and more particularly, to a position determination system that is resistant to interference caused by glint.

BACKGROUND OF THE INVENTION

Certain types of position determination system, such as wheel alignment systems, use a vision imaging system that employs optical sensing devices to determine the positions of various target devices. A wheel alignment system of this type is capable of obtaining positional information about a vehicle, such as ride height, toe curve, tilt angle, and the angular relationship of the vehicle's body relative to the vehicle's wheels.

The wheels of a motor vehicle may be aligned in a number of ways. For example, an operator or an alignment technician can use a vision imaging system, such as a computer-aided, three-dimensional (3D) machine vision that employs image sensing devices, such as cameras, to determine the positions of various target devices. Although such vision imaging systems are typically used for alignment purposes, these systems can also be used to obtain other positional and angular orientation information about a motor vehicle. Examples of such apparatus and methods are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, each incorporated herein by reference.

A computer is often used in conjunction with such vision imaging systems to calculate the orientation of the target device by identifying certain geometric characteristics on the target device. The computer takes perspective measurements and compares these measurements with the true image previously pre-programmed into the memory of the computer.

An example of a typical target device that can be used in a wheel alignment system is illustrated in FIG. 1. Target device 54 consists of a flat plate with a pattern of two or more differently sized circles 62, 63 marked in a pre-determined format thereon. Although a specific pattern is shown, a large number of different patterns can be used on the target device 54. In practice, a mathematical representation, or data corresponding to a true image (i.e. an image taken by viewing the target device perpendicularly to its primary plane) and the dimensions of the target device are preprogrammed into the memory of a computer so that, during the alignment process, the computer has a reference image to which the viewed perspective images of the target devices can be compared.

The computer calculates the orientation of the target device 54 by identifying certain geometric characteristics on the target device. The computer takes perspective measurements and compares these measurements with the true image previously pre-programmed into the memory of the computer.

The computer could, for example, calculate the center of each of the circles 62a, 62b by means of centroiding. This is a method commonly used by image analysis computers to determine the positioning of the center point or centerline of an object. Once the center points of the two circles 62a, 62b have been determined, the distance between the two can be measured. This process is then repeated for other circles in the pattern on the target device 54. These distances can then be compared to the true distances (i.e. non-perspective distances) between the respective centers. Similarly, the angle to the horizontal (or vertical) of the line joining the two centers can be determined. A calculation can then be made as to what the orientation of the target device 54 is.

Other methods of calculation can be used to determine the orientation of the target device 54. For example, the camera could sight onto only one of the circles, for example the circle 63, and by using the perspective image thereof (the distorted ellipse), calculate the orientation of that circle and, therefore, the orientation of the target device 54 as more fully described in U.S. Pat. Nos. 5,535,522 and 5,724,743.

Position determination systems using target devices and image sensing devices sometimes encounter problems when operated under strong light sources, such as the Sun. With the existence of strong light, the surface of the target devices may reflect the light in a direction entering the lens of the camera. The reflection of strong light into the camera produces a large white spot, called blooming. Blooming will interfere the receipt of images from the target devices. Although some of the target devices are made from materials that are 99% nonreflective of light, the 1% reflection of light from a strong light source, such as the sun, can still cause problem to the measurements until the sun moves off-target. Moving the target or optics as the Sun moves across the sky is impractical.

SUMMARY OF THE INVENTION

Accordingly, there exists a need for reducing the effects caused by glint to a position determination system. There is also a need to allow position determination in the presence of strong light sources. There is another need to provide a position determination system that is resistant to interference caused by glint and does not require movement or adjustment of equipment.

These and other needs are addressed by the present invention. The present invention provides an improved position determination system using target devices that prevent interference from strong light sources. This invention increases accuracy of measurements by eliminating interference from glint.

One aspect of the present invention relates to a target device for attaching to an object. The target device comprises a base configured for attaching on the object, a first target surface connected to the base, and a second target surface connected to the base, wherein the first target surface and the second target surface are on different planes. The planes on which the target surfaces locate are not parallel to each other. Since the target surfaces are on non-parallel planes, any light source producing glint on the first target surface will not cause glint on the second target surface. If light reflected by the first target surface causes interference, the image of the second target surface is still available for processing. Therefore, the interference caused by glint is eliminated.

According to one embodiment, a position determination system for measuring positional parameters of an object comprises: a target device which includes a base configured for attaching to the object, a first target surface connected to the base; and a second target surface connected to the base; wherein the planes on which the first target surface and the second target surface locate are not parallel. The position determination system has an image sensing device configured for forming a viewing path intersecting the target device and generating image information indicative of the geometric characteristics of the target device, and a data processing device configured to couple to the image sensing device for determining the orientation of the target device or the object on which the target device is attached based on the image information.

During measurement, the target device is attached to the object, such as a wheel of a vehicle, for marking each measurement. The images of the target surfaces are captured by the image sensing device, such as a camera, and analyzed by a data processing device, such as a controller or a computer coupled to the image sensing device.

According to one aspect of the present invention, the data processing device is configured for executing position determination software, such as alignment, and receiving image information representative of images captured by the image sensing device. The orientation of the target device used during the position determination process is determined based on the image information. The image information may be compared with reference information representative of images of the target device captured at a reference position. Alternatively, the reference position may be viewed from an angle perpendicular to the surface of the base. The reference information may be obtained from a hard drive memory.

As an example, the images of both target surfaces are captured by the image sensing device and transformed into image information to be processed by the data processing device. Whenever one of the target surfaces produces glint that interferes with the images received by the image sensing device, the other target surface, as discussed above, still provides reliable image information indicative of the geometric characteristics of that target surface. Therefore, interference from glint is eliminated.

Still other advantages of the present invention will become readily apparent from the following detailed description, simply by way of illustration of the invention and not limitation. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings in which like reference numerals refer to similar elements and in which.

DESCRIPTION OF THE PREFERRED EMBODIMENT

Techniques for providing a position determination system that is resistant to glint interference are presented for better explanation of the present invention. In the following description, for purpose of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A position determination system implemented according to the present invention is capable of obtaining positional information about an object. For example, the position determination system can be used to measure ride height, toe curve, tilt angle, and the angular relationship of a vehicle's body relative to the vehicle's wheels.

Figure 2:
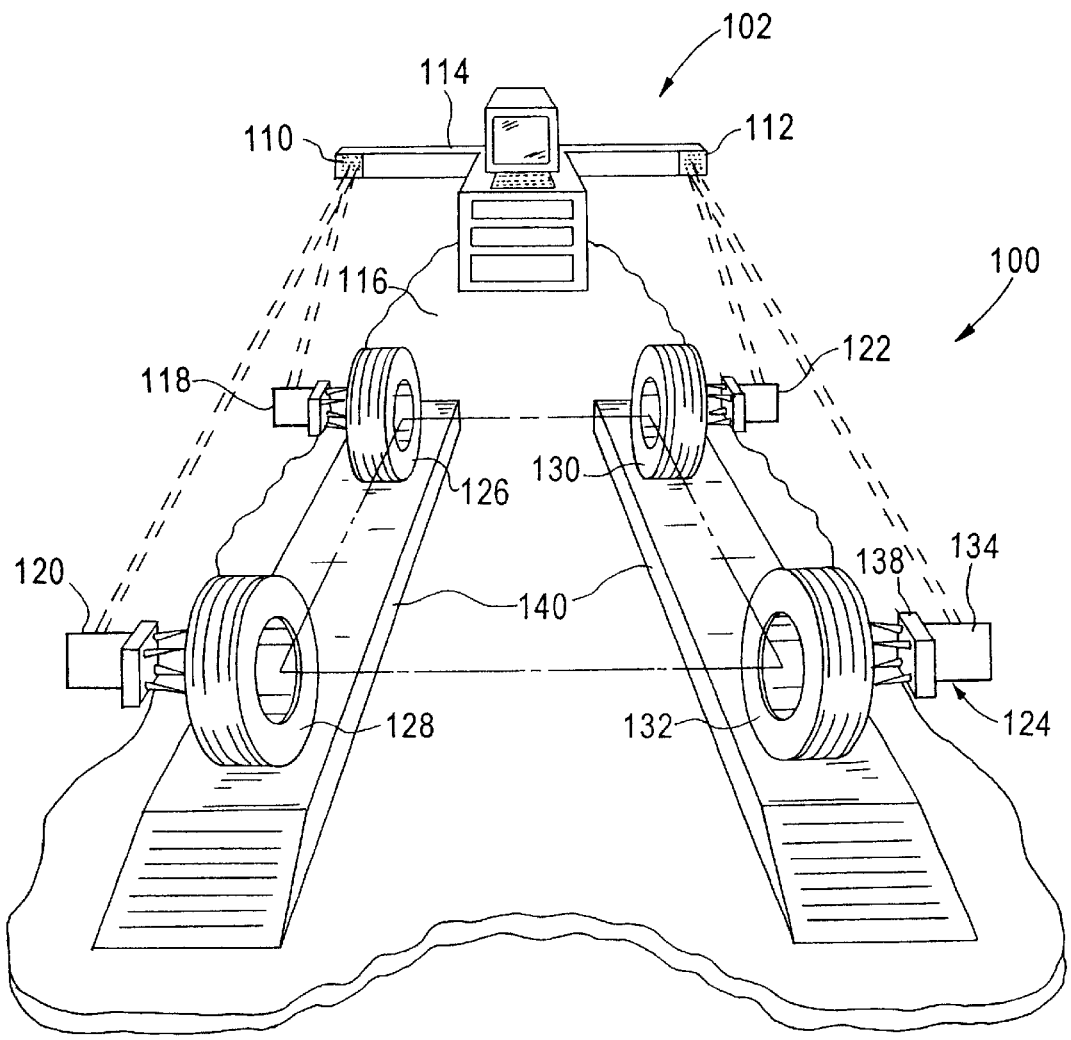
FIG. 2 shows an example of a position determination system on which the present invention may be implemented.

An example of a position determination system on which the present invention may be implemented is illustrated in FIG. 2. The position determination system 100 includes a vision imaging system 102 having a pair of fixed, spacedapart cameras 110, 112 mounted on a beam 114. The beam 114 has a length sufficient to position the cameras 110, 112 respectively outboard of the sides of the vehicle to be imaged by the position determination system 100. Also, the beam 114 positions the cameras 110, 112 high enough above the shop floor 116 to ensure that the two target devices 118, 120 on the left side of the vehicle are both within the field of view of the left side camera 110, and two target devices 122, 124 on the right side of the vehicle are both within the field of view of the right side camera 112.

Target devices 118, 120, 122, 124 are mounted on each of the wheels 126, 128, 130, 132 of the motor vehicle, with each target device 118, 120, 120, 124 including a target body 134, and an attachment apparatus 138. The attachment apparatus 138 attaches the target device 118, 120, 120, 124 to wheel 126, 128, 130, 132. An example of an attachment apparatus is described in U.S. Pat. No. 5,024,001, entitled "Wheel Alignment Rim Clamp Claw" issued to Borner et al. on Jun. 18, 1991, incorporated herein by reference.

In operation, once the position determination system 100 has been calibrated using a calibration target (not shown), as described in U.S. Pat. No. 5,535,522 and 5,724,743, a vehicle can be driven onto the rack 133, and, if desired, the vehicle lifted to an appropriate repair elevation. The target devices 118, 120, 122, 124, once attached to the wheel rims, are then oriented so that the target devices face the respective camera 110, 112.

A computer-implemented database may be used to assist determination of the target position. As an example, the vehicle model and year can be entered into the vision imaging system 102 along with other identifying parameters, such as vehicle VIN number, license number, owner name, etc. A database associated with the vision imaging system 102 preferably includes specifications for each model of vehicle that might be inspected. Upon identification of the vehicle being inspected, the information associated with the specific vehicle model is extracted from the database to assist determination of the position of the target devices 118, 120, 122, 124. Alternatively, a previous inspection history of the particular vehicle can be used to indicate the likely position of the target devices 118, 120, 122, 124.

The location of the target devices 118, 120, 122, 124 relative to the rim of the wheels 126, 128, 130, 132 to which the target devices are attached are typically known to an accuracy of about 0.01' and about 0.010. Once the target devices 118, 120, 122, 124 have been imaged in one position, the wheels 126, 128, 130, 132 are rolled to another position and a new image can be taken. Using the imaged location of the target devices 118, 120, 122, 124 in the two positions, the actual position and orientation of the wheels 126, 128, 130, 132 and wheel axis can be calculated by the vision imaging system 102. Although the distance between the two positions varies, the distance is often approximately 8 inches both forward and back.

Figure 1:
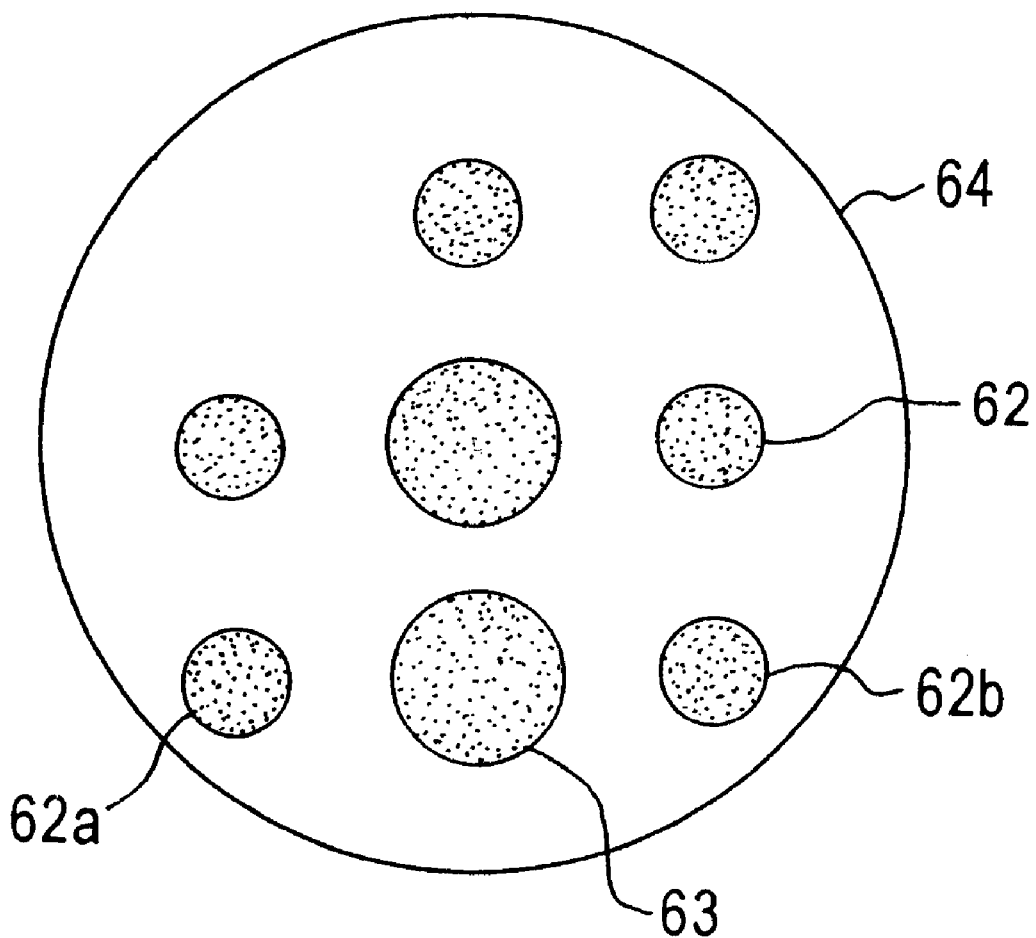
FIG. 1 illustrates an example of a typical target device that can be used on the wheels of a vehicle for position determination.
Figure 3A:
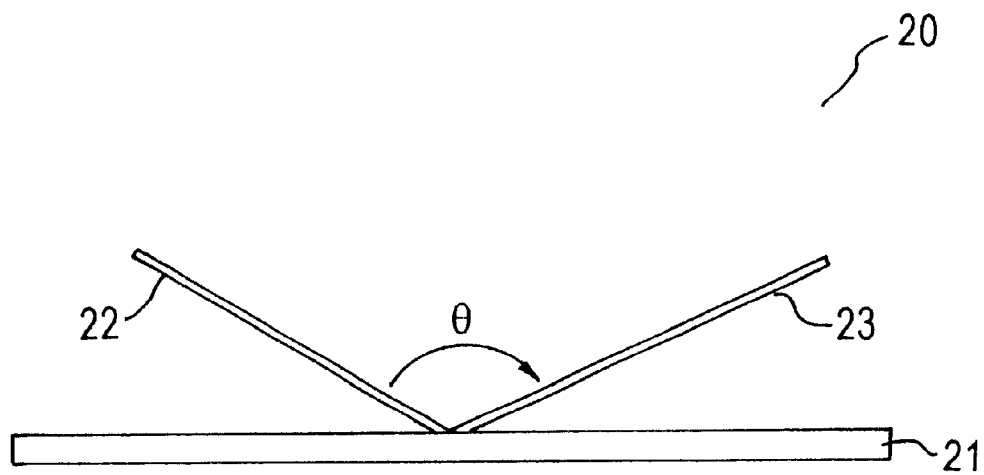
FIGS. 3a and 3b is an perspective view of examples of target device implemented according to the present invention.
Figure 3B:
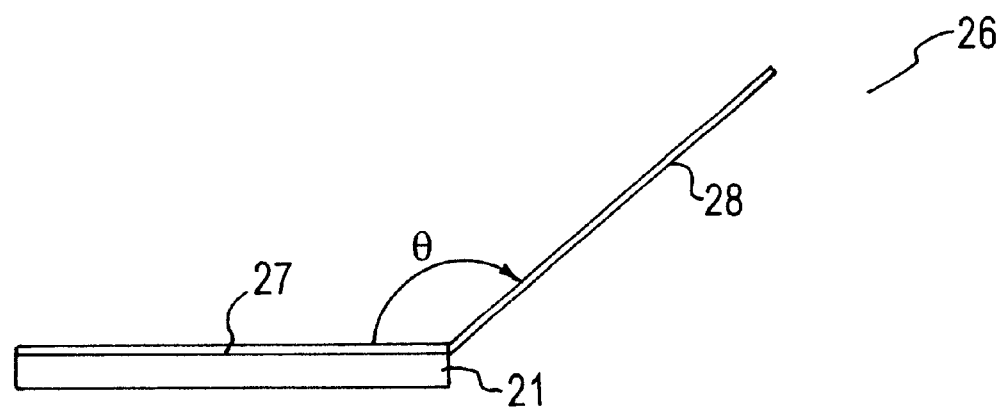

FIGS. 3a and 3b illustrate examples of target devices implemented according to the present invention. Target device 20 in FIG. 3a has a base 21, a first target surface 22 and a second target surface 23 extending from the base. Patterns, such as the circles described in FIG. 1, are provided on the target surfaces. Base 21 is configured to attach to an object where measurement will be conducted, such as the target body 134 or the attachment apparatus 138 as illustrated in FIG. 2. In one example, the target body 134 works as the base 21, and the target surfaces are attached to the target body 134. As another example, the attachment apparatus 138 works as the base of the target device and the target surfaces are connected to the attachment apparatus. The angle between target surface 22 and target surface 23 is Θ. The proper angle θ between the target surfaces may be measured empirically in the environment in which the system will be used. The angle θ is typically 170° or less, depending on the environment and optics employed.

Another embodiment of target devices, illustrated in FIG. 3b, is designated as 26 and has a first target surface 27 connected to a second target surface 28. Unlike the target device illustrated in FIG. 3a, the plane on which target surface 27 is located is not parallel to the base 21. The angle between target surfaces 27 and 28 is θ, and, like θ in FIG. 3a, is easily determined empirically.

Figure 4A:
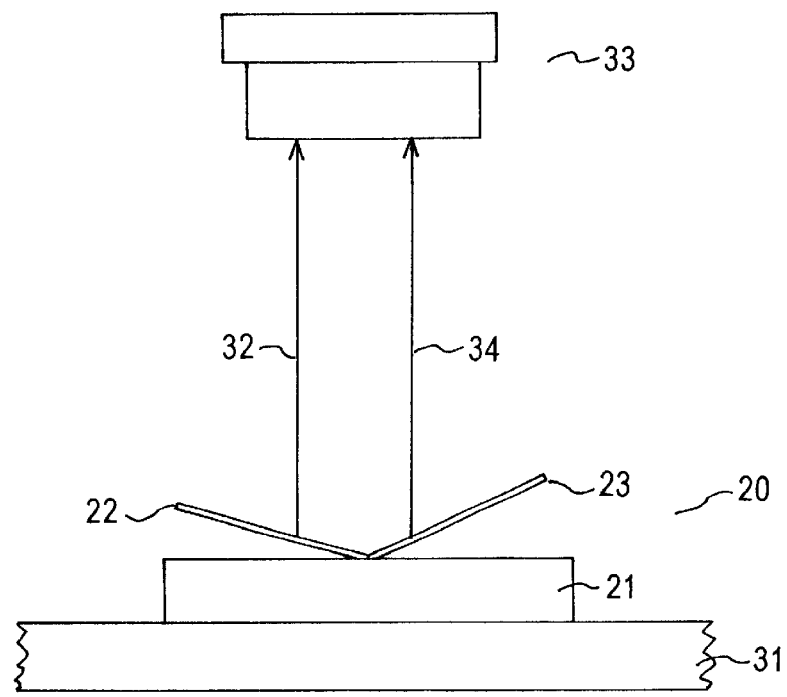
FIGS. 4a and 4b illustrate of an example of a target device implemented according to the present invention operated under a strong light source.
Figure 4B:
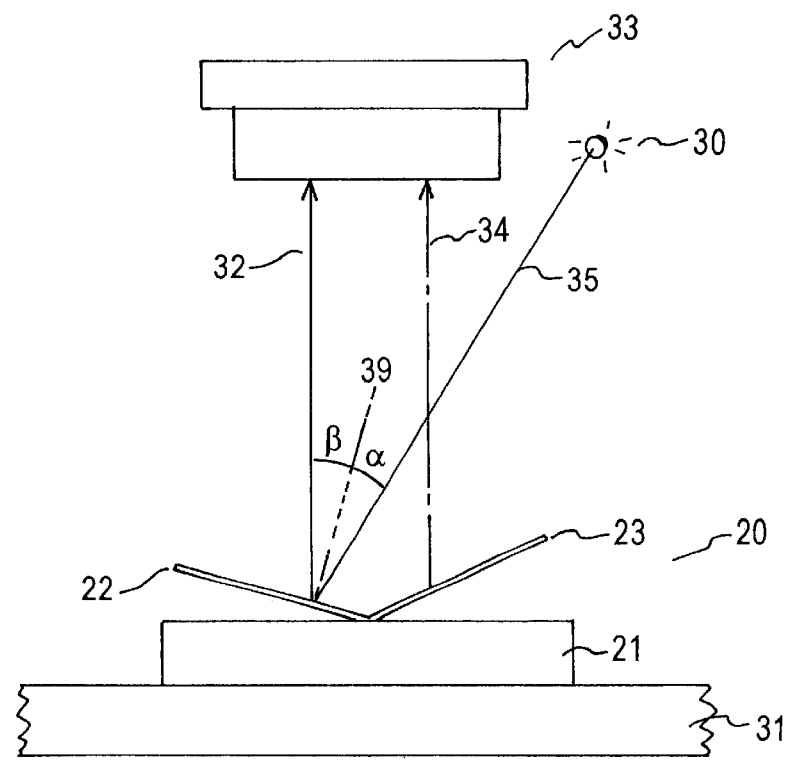

FIGS. 4a and 4b illustrate an example of a target device implemented according to the present invention operated under a strong light source. In FIG. 4a, a target device 20 similar to that illustrated in FIG. 3a is attached to the surface of an object 31. Target surfaces 22 and 23 have patterns similar to those illustrated in FIG. 1. A camera 33 is used to capture images from the target device 20. Images of patterns on target surfaces 22 and 23 are captured by the camera 33 via paths 32 and 34 respectively.

FIG. 4b shows the effects of a strong light source to the target device implemented according to the present invention. When the sun 30 moves to a specific position where the angle a between the sunlight 35 and a line 39 normal to target surface 22 equals the angle between path 32 and the line 39, sunlight 35 will be reflected by the target surface 22 and enters the camera 33 along the path 32 by which the camera 33 used to capture images from patterns on target surface 22. In this case, the reflection of the sunlight 35 will interfere with the pattern images captured from target surface 22.

However, since target surfaces 22 and 23 locate on non-parallel planes, sunlight 35 will not be reflected by the target surface 23 and thus will not interfere with the pattern images captured from target surface 23 along path 34. Accordingly, calculation of positional parameters can be made based on the unaffected images. Therefore, interference from glint is eliminated.

Figure 5:
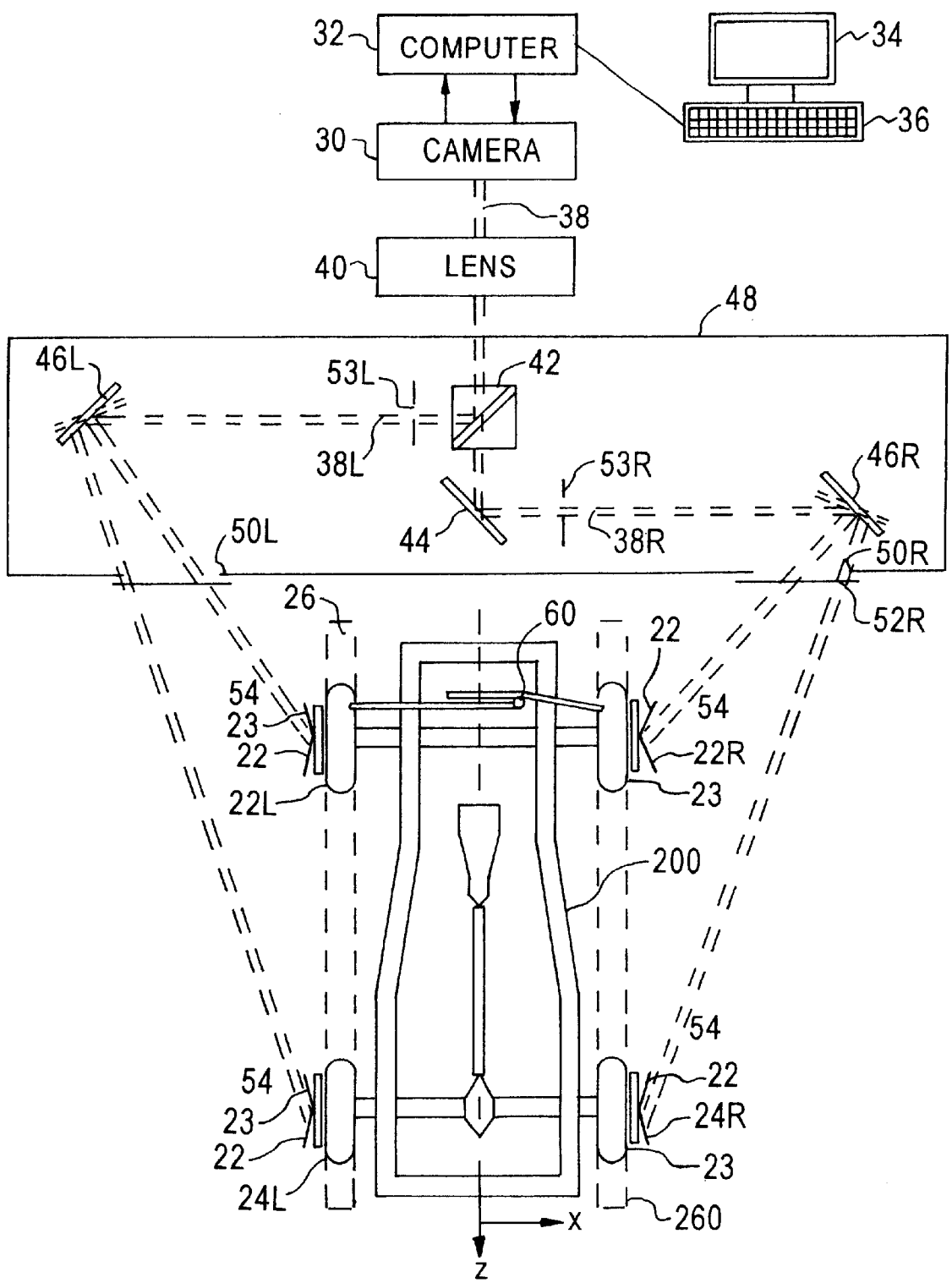
FIG. 5 shows an example of a wheel alignment system implemented according to the present invention.

As another example, FIG. 5 shows a wheel alignment system implemented according to the present invention. A motor vehicle 200, on which wheel alignment is to be performed, is represented by a schematic illustration of its chassis and is shown to include two front wheels 22L and 22R and two rear wheels 24L and 24R. The vehicle 200 is shown positioned on a conventional wheel alignment test bed 260, indicated in dotted lines. The system uses target devices 54 similar to those shown in FIGS. 3a or 3b having target surfaces 22 and 23 attached thereto.

Camera 30 forms viewing paths intersecting the target devices 54 by using combinations of lens and mirrors. Camera 30 sights simultaneously both onto one of the target surfaces of each target device 54 attached on wheels 22L, 22R, 24L and 24R along a view path 38 which passes through lens 40 and onto a beam splitter 42 and mirrors 46L and 46R. Mirrors 46L and 46R may comprise a plurality of mirrors aiming at different wheels, respectively, so that the image of each wheel is captured by a separate mirror.

A computer 32 is coupled to the camera 30. Images captured by camera 30 are transformed into image information accessible by the computer 32. The calculation of positional parameters will be made based on image information that is not affected by the glint. According to one embodiment, image information produced by glint can be removed by a low-pass filter circuit.

The computer 32 stores information about the patterns on the target surfaces viewed from a certain angle. The information can be used to calculate the orientations of the target surfaces and the surfaces of the wheels. In one embodiment, patterns viewed from an angle perpendicular to the base of the target device are stored in the computer 32. Information with regard to configurations of the target device, such as the angle between the two target surfaces, the dimensions of the target devices, and the angles between the target surfaces and the base, may be pre-stored in the computer 32 as in the previously described embodiment, details on the calculations made to determine object orientation based on target images are given in the patents cited.

While this invention has been described in connection with an exemplary embodiment, it is to be understood that the invention is not limited to the disclosed embodiment, but on the contrary, is intended to cover various modifications and equivalent arrangements included within the spirit and scope of the appended claims.

What is claimed is:

1. A glint-resistant position determination system for measuring position parameters of an object, comprising:
   a glint-resistant target device including:
      a base configured for attaching to the object,
      a first target surface connected to the base; and
      a second target surface connected to the base;
      wherein the planes on which the first target surface and the second target surface locate are non-parallel to each other, wherein one of said target surfaces produces pattern images unaffected by glint, even if glint exists;
   an image sensing device configured for forming a viewing path intersecting the target device and generating image information indicative of the geometric characteristics of the target device; and
   a data processing device configured to couple to the image sensing device for determining the orientation of the object based on the image unaffected by the glint.

2. The system of claim 1, wherein the data processing device comprises:
   a data processing unit;
   a data storage device;

a display; and a bus coupled to the data processing unit, the display and the data storage device.

3. A method for determining positional parameters of an object using a glint-resistant target device that is capable of producing pattern images unaffected by glint even if glint exists, the glint-resistant target device comprising a base configured to attached to the object, and a first and second target surface attached to the base, wherein the planes on which the first target surface and the second target surface located are non-parallel to each other, the method comprising:

forming a viewing path intersecting the target device, wherein the target device includes the first target surface and the second target surface attached to the base and wherein the planes on the first target surface and the second target surface located are non-parallel to each other;

capturing images of the target device;

determining the existence of glint on the target device; and calculating positional parameters of the object based on images unaffected by the glint.

4. A glint-resistant wheel alignment system for determining positional parameters of a wheel of a vehicle, comprising:

a glint-resistant target device including:
- a base configured for attaching to the vehicle;
- a first target surface connected to the base; and
- a second target surface connected to the base;
- wherein the planes on which the first target surface and the second target surface locate are non-parallel to each other, wherein one of said target surfaces produces pattern images unaffected by glint, even if glint exists;

an image sensing device configured for forming a viewing path intersecting the target device and generating image information indicative of the geometric characteristics of the target device; and a data processing device configured to couple to the image sensing device for determining the orientation parameters of the wheels of the vehicle based on the images unaffected by the glint.

5. The system of claim 4, wherein the target device is attached to the wheels of the vehicle.

* * * * *